Dec. 12, 1950     C. R. LIVERMON     2,533,271
ROAD VEHICLE

Filed Feb. 28, 1945     4 Sheets-Sheet 1

Inventor:
Carl R. Livermon
By Pierce & Scheffler
his Attorneys.

Inventor:
Carl R. Livermon
By Pierce & Scheffler
his Attorneys.

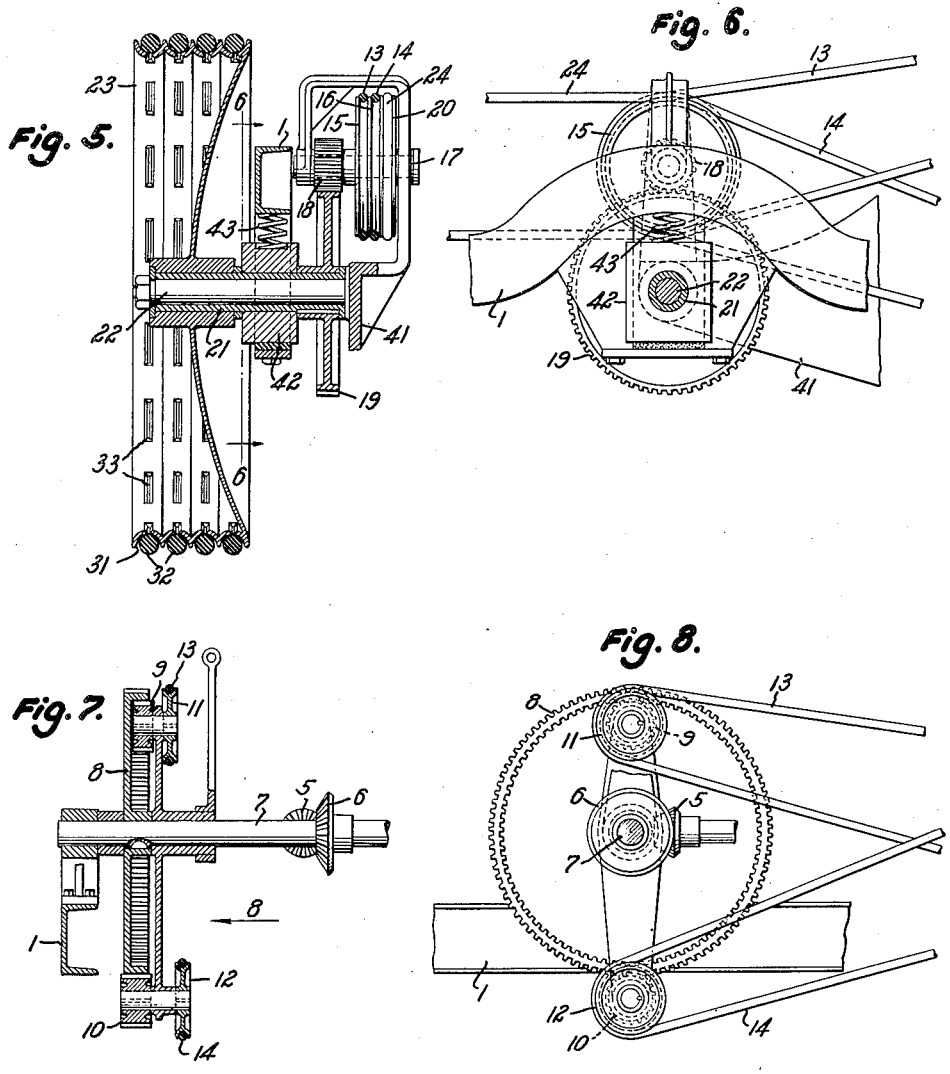

Dec. 12, 1950     C. R. LIVERMON     2,533,271
ROAD VEHICLE

Filed Feb. 28, 1945     4 Sheets-Sheet 4

Inventor:
Carl R. Livermon
By Pierce & Scheffler
his Attorneys.

Patented Dec. 12, 1950

2,533,271

UNITED STATES PATENT OFFICE 2,533,271

ROAD VEHICLE

Carl R. Livermon, Roxobel, N. C.

Application February 28, 1945, Serial No. 580,102

5 Claims. (Cl. 305—9)

This invention relates to vehicles of the self-laying track type.

An object of the invention is to provide a vehicle of this type which may be made of any desired size or weight but the design of which is particularly adapted for small light weight vehicles such as would be useful, for example, for gardening, in factories, and warehouses; and in war machines designed to carry only one man with small weapons such as a machine gun, rocket gun, flame thrower or the like.

My invention is based upon the use of a plurality of parallel, endless, flexible belts suitably made of rubber or rubber composition and provided with suitable reinforcing such as a core of rope or flexible metal wire or cable and with a suitable tread surface, said belts being arranged side by side in grooves on two alined wheels at least one of which may be driven and providing a tread of suitable width, depending upon the size, number and spacing of the belts, the span of the resulting tread in contact with the supporting surface depending upon the distance between the axles of the wheels.

A vehicle provided with a self-laying track or tread of this type was proposed some years ago but so far as I am aware has never come into commercial use presumably due to a failure satisfactorily to solve one or more of the problems involved in providing a successful vehicle of this type.

Further objects of my invention therefore are to provide for the tensioning of the belts, for preventing the accumulation of dirt in the grooves in the wheels in which the belts run, for preventing the belts from jumping out of their grooves especially when the machine is turned, for making the machine readily turnable, for driving the machine in either direction and in general to provide a practical and successful machine of this type.

A machine in accordance with my invention is illustrated in the accompanying drawings in which Fig. 1 is a side elevation of a complete machine having two pairs of traction treads, Fig. 2 is a top plan view of the machine shown in Fig. 1.

Fig. 5 is a vertical section through the traction wheel of the traction unit shown in Figs. 3 and 4.

Fig. 6 is a side elevation of a portion of the traction unit of Fig. 3 with the traction wheel removed to reveal the frame and a part of the driving mechanism.

Fig. 7 is a vertical section of another part of the driving mechanism.

Fig. 8 is a side elevation of the part of the driving mechanism shown in Fig. 7.

Fig. 9 is an enlarged fragmentary section of the traction wheel.

In the above descriptions of the drawings, reference is made to a traction unit. By this term is meant one set of belts with its supporting wheels and the associated belt tensioning means and does not include the frame of the machine, the motor or the means for transmitting power from the motor to the set of belts.

Figures 1, 2:
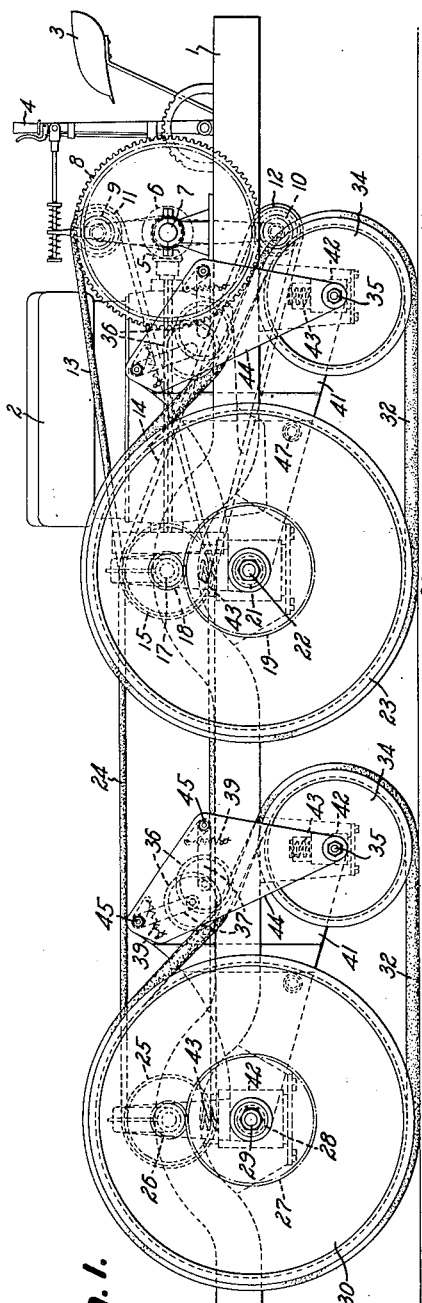
Figure 3:
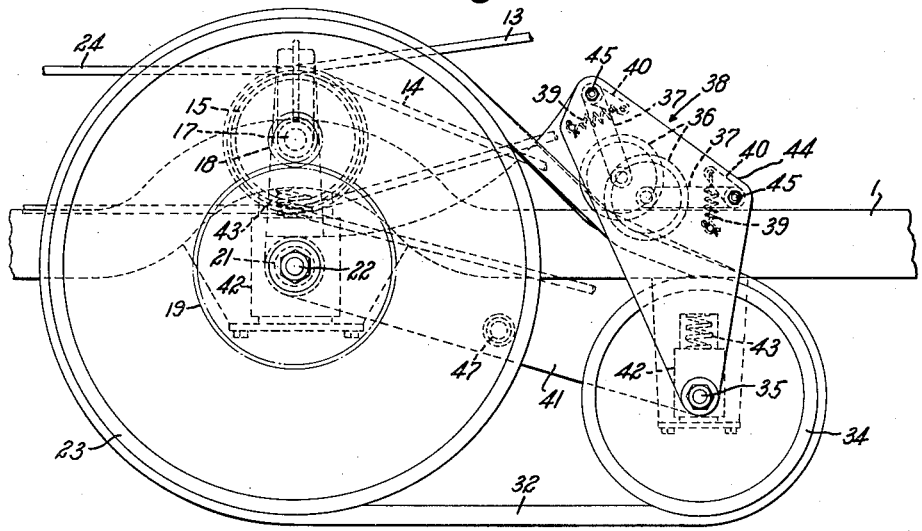
Fig. 3 is an enlarged side elevation of one of the rear traction units of Fig. 1.
Figure 4:
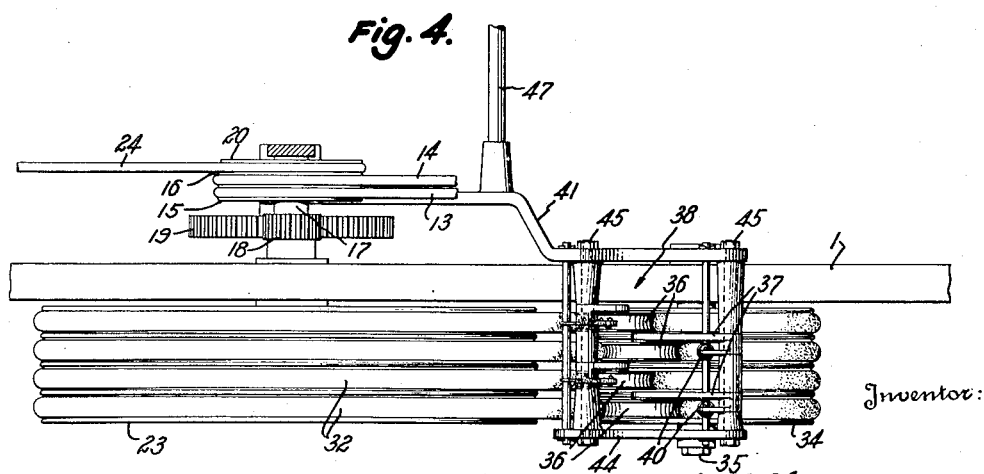
Fig. 4 is a top plan view of the traction unit shown in Fig. 3.

Referring to the drawings, 1 is the frame of the machine, 2 the motor, 3 the driver's seat, and 4, 4 the control levers which may be shifted by the operator from neutral position, as illustrated in Figs. 1 and 2, to either forward or reverse position. The motor 2 drives the pinion 5, the gear 6, the shaft 7, two ring gears 8, 8, the pinions 9, 9 and 10, 10, the pulleys 11, 11, and 12, 12 which drive the forward and reverse transmission belts 13, 13 and 14, 14. Belts 13, 13 and 14, 14 are preferably V belts of the type commonly used for transmitting power and drive the pulleys 15, 15 and 16, 16 on the shafts 17, 17 which carry the pinions 18, 18 and drive the gears 19, 19 and pulleys 20, 20. Gears 19, 19 are keyed to and turn sleeves 21, 21 on the stationary axles 22, 22 and turn the wheels 23, 23 of the rear traction units. Pulleys 20, 20 drive the power transmitting belts 24, 24 which pass over and drive the pulleys 25, 25 and the pinions 26, 26 which mesh with and drive the ring gears 27, 27 and sleeves 28, 28 (similar to sleeves 21, 21) on the stationary axles 29, 29 and thus drive the wheels 30, 30 of the front traction units.

Wheels 23, 23 and 30, 30 are similar, each being provided with a plurality (four) circumferential grooves 31 in which run the traction belts 32. Grooves 31 preferably are positioned as closely together as possible and preferably are of generally semicircular cross section on a somewhat larger radius than that of the circular cross section of the belts 32. This relative size of the grooves 31 and belts 32 permits the belts to spread when compressed by the weight of the vehicle. The grooves preferably spread slightly adjacent their edges and their edges are rounded to avoid cutting the belts 32 when they are flattened in the grooves by pressure contact with the supporting surface. It will be understood that the belts need not be circular in cross section, it being within the scope of my invention to use any other suitable cross sectional shape for both the grooves and the belts. The grooves are provided with spaced slots 33 to permit any dirt or mud caught in the grooves under the belts to be squeezed through the slots. It will be understood that fluent material such as dry dirt and liquids will flow or fall from the wheels and the bulk of the pasty material such as mud which sticks to the wheels will be squeezed out at the sides of the belts but some mud or the like may be caught directly under the belts and it is advantageous to permit this mud to be squeezed through the slots 33. Slots 33 are relatively narrow where they penetrate the wheel or groove surface but widen out toward the axle of the wheel to facilitate the flow of material through them.

It will be understood that the longitudinal slots 33 shown in Figs. 5 and 9 are merely illustrative and that other shapes and arrangements of slots or openings are within the purview of my invention. The slots may for instance extend at right angles to or diagonally across the grooves and they may extend inwardly and only part way across the grooves either at right angles or diagonally from both sides of the groove in non-over-lapping or in over-lapping staggered relation. Also instead of a single longitudinal slot as shown in Figs. 5 and 9 there may be several parallel longitudinal slots distributed across the groove, side by side or in staggered relation. The openings may be in the form of slots or they may have other shapes such as circular or square and they may be arranged in rows around the rim in the grooves of the wheel.

Belts 32 run over wheels 34 each of which has the same number of grooves as the wheels 23 and 30, the grooves being of the same cross sectional shape and provided with slots similar to slots 33.

A feature of my invention is the provision of such a relationship between the diameters of the wheels, the length of the traction span of the belts, the diameters of the belts and the depth of the grooves 31 that the belts will not be displaced from their grooves as when striking a stone or other obstructions or when the machine is turned, both of which tend to bend the belts sidewise as they enter the grooves and to throw them out of the grooves. I have found that with belts of standard construction made of rubber and cord or fabric and reinforced with steel wire, or cable or other substantially unstretchable core, and of substantially circular cross section, the ratio of the diameter of the cross section to the length of the traction span should be at least of the order of 1 to 20, the grooves in which the belts travel should have a depth at least equal to half the diameter of the belt and the traction span of the belt should not exceed about 20 percent of the total length of the belt. There must of course be sufficient friction between the belts and the drive wheel to prevent the belts from slipping or in other words the traction between the belts and the drive wheel should be greater than the maximum traction between the belts and the surface upon which the vehicle is operated. These conditions are satisfied when the circumference of the drive wheel is at least about half the length of the belts and when the span of the belts in contact with the drive wheel is at least equal to the traction span of the belts. In terms of concrete embodiment the traction unit must consist of a drive wheel, the circumference of which, as stated, is at least half of the length of the belts and another wheel spaced from the drive wheel the distance necessary to provide the desired traction span. The second wheel need be only large enough to avoid bending the belts too sharply, depending upon their flexibility and may vary from this size up to a size equal to the size of the drive wheel. In practice it is preferred to use a second wheel which is smaller than the drive wheel.

Referring to the drawings it will be seen that the diameter of the small wheel 34 of each drive unit is about half the diameter of the drive wheel 23 or 30 of each unit and that its axle 35 is positioned at a distance from the axle of the drive wheel only slightly greater than the sum of the radii of the two wheels. This proportioning of sizes and distances provides a traction unit having ample traction between the traction belts and the drive wheel to prevent the belts from slipping on the drive wheel and a traction between the belts and the surface upon which the vehicle is to be operated which is many times the traction that would be provided by contact of the drive wheel with the surface and at the same time provides a traction unit in which the belts cannot be thrown off of the carrying wheels in spite of the fact that almost half of the diameter of each belt protrudes from the wheel grooves for contact with the supporting surface. The belts 32 are maintained at proper tension by the pulley wheels 36 pivotally and rotatably carried on the arms 37 in the frame 38 and flexibly held against the belts by the springs 39 attached at one end to the frame and at their other ends to the levers 40. It will be noted that the tension pulleys 36, arms 37, springs 39, and lever arms 40 are so arranged that a substantially constant pressure is exerted against each belt in spite of variations in the position of the belt and pulley within normal range of movement.

Specifically as the spring is stretched and its tension is increased, the effective length of arm 40 decreases and vice versa. In order to permit the wheels 36 to be mounted close together and to prevent interference, alternate wheels are supported on opposite sides of the frame 38. It may be desirable in order to avoid interference to mount the pulleys 36, so that the axles of the wheels on one side clear the peripheries of the wheels on the other side of the frame.

Figure 10:
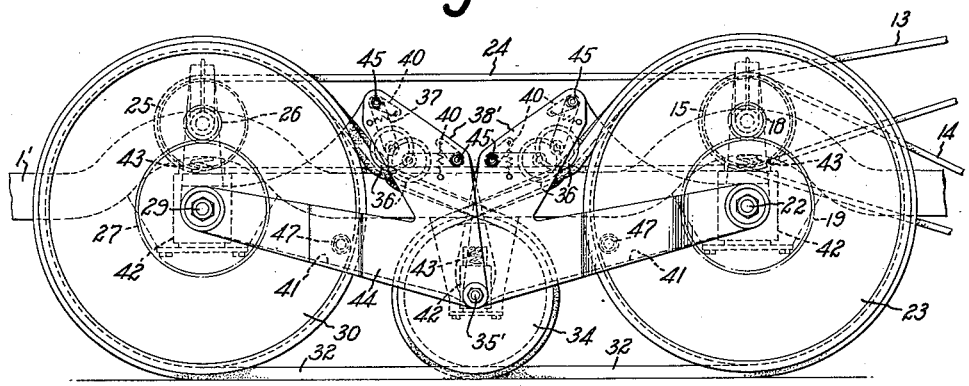
Fig. 10 is a side elevation of a vehicle having modified arrangement of the traction units and Fig. 11 is a top plan view of the coupled traction units on one side of the vehicle of Fig. 10.
Figure 11:
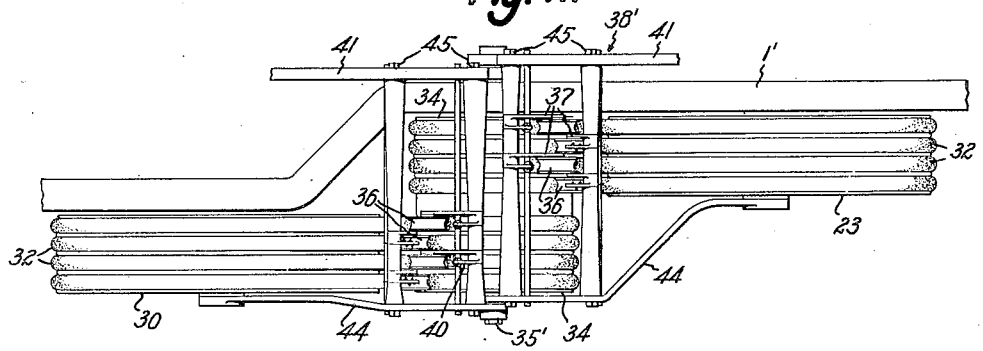

Referring to Figs. 10 and 11, it will be seen that I have consolidated a combination of four traction units by reversing the direction of the rear units so as to bring the small wheels 34 of the front and rear traction units together and by mounting the small wheels of the front and rear traction units side by side on the same axle. This combination also involves a unification of the frames 38 carrying the tension pulleys 36, and a shaping of the frame 1 of the machine to take care of the offset arrangement of the drive wheels 23 and 30. Consequently in Figs. 10 and 11 the modified parts of the machine are marked by primed numerals i. e. frame 1', frame 38', and axle 35'. This modified arrangement of the traction units makes possible a substantial shortening of the machine without reduction of its tractive capacity and without modification of the traction units, other than the unification of the frames 38 and the axles 35 of the small wheels. Those features of each traction unit which are critical for preventing the traction belts from being thrown off of their carrying wheels remain unchanged.

It will be apparent that the traction unit may be used in one, two or more pairs and that each group of two pairs may be combined as shown in Figs. 10 and 11. The rigid frame of each traction unit comprises the large or traction wheel axle 22 or 29, the side member 41 and the axle 35 of the small wheel. The wheel axles extend through the bearing blocks 42 carried by the frame 1 of the machine in the well known manner. It is noted however that the bearing block mountings include the springs 43 which not only provide the customary cushioning between the wheels and the frame of a vehicle but also permit sufficient rocking of each traction unit with respect to the frame to allow the traction surface to follow irregularities in the supporting surface. The side plate 44 of the frame 36 is supported to the member 41 by the bolts 45 which serve also as axles for the bearing ends of the arms 37. The lower end of side plate 44 is provided with an opening which fits over the axles 35 thus forming the rectangular frame consisting of the side member 41, the bolts 45, the side plate 44, and the axle 35.

In machines in which traction units are combined in pairs as illustrated in Figs. 1, 2, and 10, it is desirable also to tie the units of each pair together by the cross bar 47.

The traction unit may be used for a variety of purposes. The means for driving a wheel of each unit may be omitted and a pair of them used as a free running vehicle such as a trailer. Generally a traction unit may be used to replace a wheel in any sort of vehicle including the landing gear of airplanes.

The operation of the machine is believed to be apparent from the foregoing description excepting the mechanism for transmitting power from the engine to the wheels which operates as follows. The ring gear 8, see Fig. 8, has internal and external teeth. Gear 8 always turns in the same direction but as will be apparent, will drive the cog wheels 9 and 10 and their axles and the pulleys 11 and 12 in opposite directions. When the operating lever 4 is in neutral position, both of the belts 13 and 14 clear the pulleys 11 and 12 sufficiently that the pulleys may turn while the belts remain stationary. Belts 13 and 14 are held clear of pulleys 11 and 12 by positioning fingers, (not shown) this being a well known expedient. When the lever 4 is pushed forwardly, belt 13 is further loosened with respect to pulley 11 but belt 14 is tightened on pulley 12 and the machine is driven forward. When the lever 4 is pulled backward belt 13 is tightened, belt 14 loosened and the machine driven backward. Thus it will be seen that the traction units on each side of the machine are separately controlled by the levers 4, 4 and that the machine may be driven straight forwardly or backwardly or turned either way by running the units on one side in one direction and while holding the units on the other side stationary or running them in the opposite direction.

I claim:

1. A land vehicle comprising a frame, at least two pairs of traction units connected to said frame to carry the same, said traction units each comprising two alined wheels with grooved traction surfaces with independent endless flexible belts running in each groove, the traction units of each pair being connected side by side to said frame to move in parallel paths and the two pairs of traction units being connected in alignment to said frame to travel in the same path, and a common axle for the front wheel of the rear traction unit and the rear wheel of the front traction unit on each side of said vehicle.

2. A traction unit comprising two pairs of alined wheels, each alined pair of wheels having parallel alined grooves, a continuous independent traction belt running in each pair of alined grooves and means for independently tensioning each belt, one wheel of each pair having an independent axle and one wheel of each pair being mounted on the same axle.

3. A land vehicle comprising a rigid frame and at least one pair of traction units secured to said frame to carry the same, each of said traction units comprising two pairs of alined wheels, each alined pair of wheels having parallel alined grooves, a continuous independent traction belt running in each pair of alined grooves, and means for independently tensioning each belt, one wheel of each pair having an independent axle and one wheel of each pair being mounted on the same axle.

4. A traction unit as defined in claim 2 in which the wheels mounted on independent axles are drive wheels, said drive wheels are of circumferences at least about half the length of the belts around them, the drive wheel contacting span of each belt is at least equal to the horizontal distance between the centers of the pair of wheels carrying said belt, the belts are of circular cross-section, and the grooves are of substantially semi-circular cross-section on larger radii than that of the belts which they carry.

5. A traction unit comprising two alined wheels each having a plurality of parallel grooves in their tread surfaces, a plurality of continuous independent flexible bands each fitted into corresponding grooves in said two wheels and extending between the wheels to provide traction spans and non-traction spans, two wheel axles, a rigid member connecting an end of each axle, at least one transverse shaft supported at one end on said rigid member and transversely overlying the non-traction spans, a side member secured to the opposite end of one of said axles and supporting the other end of said transverse shaft, and a spring pressed tensioning means for each of said bands independently pivoted on said transverse shaft.

CARL R. LIVERMON.

REFERENCES CITED

The following references are of record in the file of this patent:

UNITED STATES PATENTS

| Number | Name | Date |
|---|---|---|
| 315,687 | Whiting | Apr. 14, 1885 |
| 571,326 | Angell | Nov. 17, 1896 |
| 1,106,046 | Houghton | Aug. 4, 1914 |
| 1,112,460 | Leavitt | Oct. 6, 1914 |
| 1,306,884 | Drexler et al. | June 17, 1919 |
| 1,307,092 | Fuchs | June 17, 1919 |
| 1,337,905 | Groves | Apr. 20, 1920 |
| 1,354,219 | Seltenright | Sept. 28, 1920 |
| 1,450,643 | Platt | Apr. 3, 1923 |
| 1,821,196 | Worley | Sept. 1, 1931 |

FOREIGN PATENTS

| Number | Country | Date |
|---|---|---|
| 75,470 | Austria | Feb. 10, 1919 |